No. 706,463. Patented Aug. 5, 1902.
W. L. SMITH.
EDUCATIONAL APPARATUS.
(Application filed Mar. 18, 1901.)
(No Model.)
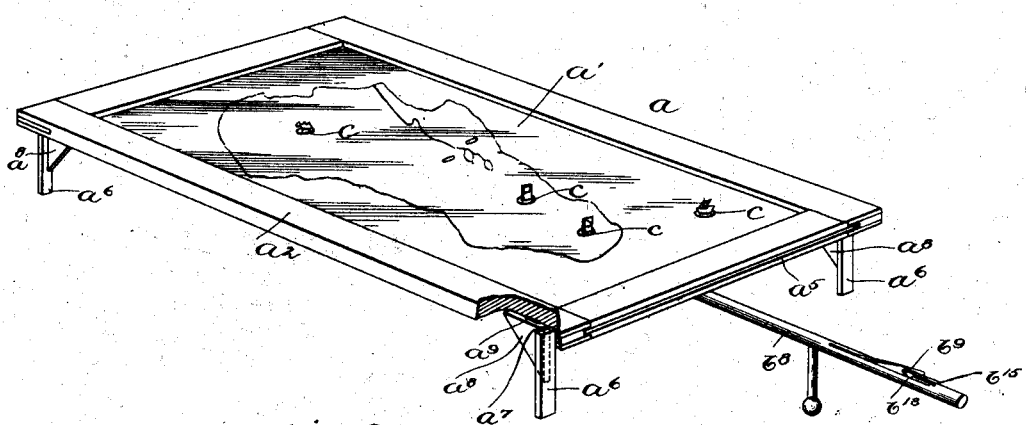
Fig. 1.
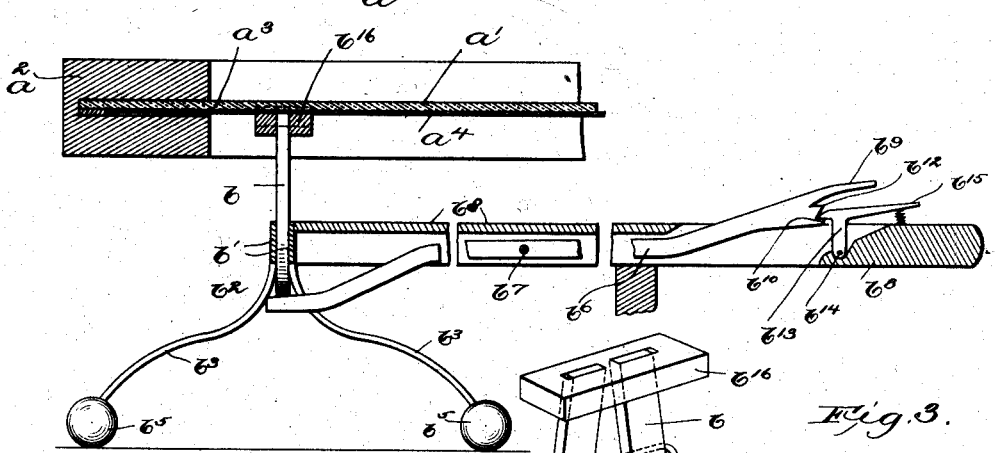
Fig. 2.
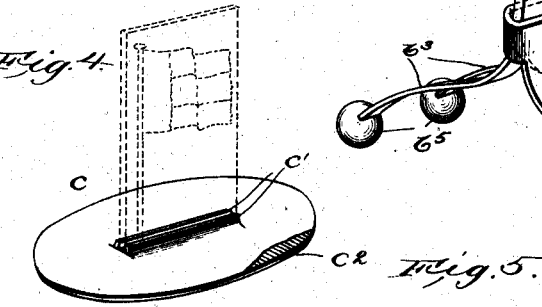
Fig. 4.
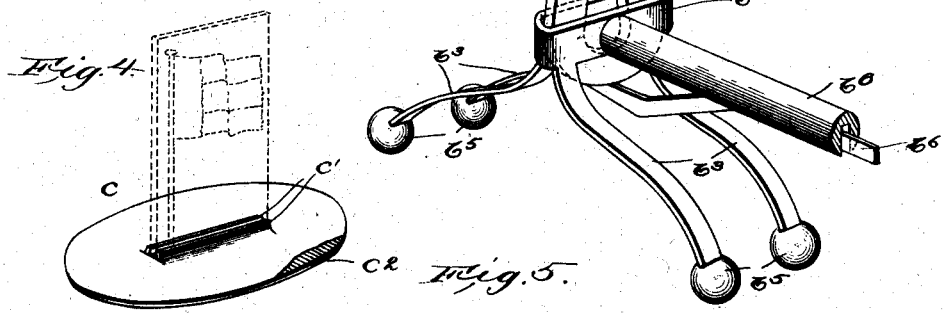
Fig. 3.
Fig. 5.
Witnesses.
W. C. Lunsford.
A. B. Kaiser.
Inventor
William L. Smith.
By Crosby Gregory
attys.

UNITED STATES PATENT OFFICE.

WILLIAM LORD SMITH, OF BOSTON, MASSACHUSETTS.

EDUCATIONAL APPARATUS.

SPECIFICATION forming part of Letters Patent No. 706,463, dated August 5, 1902.

Application filed March 18, 1901. Serial No. 51,638. (No model.)

*To all whom it may concern:*

Be it known that I, WILLIAM LORD SMITH, a citizen of the United States, residing at Boston, county of Suffolk, State of Massachusetts, have invented an Improvement in Educational Apparatus, of which the following description, in connection with the accompanying drawings, is a specification, like letters on the drawings representing like parts.

My invention is an educational appliance adapted to be used as a toy, combining instruction and amusement, and being particularly intended to facilitate the rapid increase of knowledge and strengthening of the memory and the power of application of youths.

My invention aims at enforcing upon the attention of the youth, by graphic means, of geographical outlines, so that the same may be indelibly fixed in the memory, both by reason of the powers of observation of the user and by reason of the manual attention to the details in the act of drawing or copying, combined with magnetically-operable designations of ancillary data connected with the various geographical localities, said data being preferably in the nature of historical, ethnological, geological, botanical, zoological, sociological, &c., information; and to this end the preferred embodiment of my invention resides in a suitable table with a translucent and partially-transparent surface in connection with means beneath the same for receiving a map or subject to be copied, the said map being observable through the said surface, so that the youth may copy the same with a pencil or crayon on the said surface, the latter being raised sufficiently to permit a special magnetic actuator or moving medium to be operated freely beneath the same in such proximity to the said surface or table as to cause a corresponding movement, as may be desired, of movable blocks or information-stations placed on top of the said table. The said blocks may contain representations, for instance, of the fauna of a country or larger geographical division, if desired, and in such case the pupil, after having drawn the outlines of the map, and thereby fixed the same in his memory, will be required to locate in the proper localities the different blocks in such manner as to represent accurately the proper distribution of the fauna of the country or division, the said proper locating of the blocks not being accomplished by actual handling of the same, which would tend to divert the attention and prevent the close mental application and continuity of thought which it is the purpose of this invention to promote, but by the concealed magnet, so that the blocks are moved by the imperceptible magnetic influence acting through the relatively thin drawing-surface, thereby tending to concentrate the attention of the user upon the idea which is being carried out without any liability of distraction because of mechanical accessories.

It has been my object to devise an apparatus the use of which enforces in a natural manner following the usual mental habits of children and youths a sequence of data, which, if taught from books in usual manner, would be irksome and difficult of retention, but which follows so naturally and logically as a toy or game that before he knows it the youth has fixed it all in his memory, and I regard as one of the chief merits of my invention the combination in one apparatus of means for training the eye, the hand, and the mind to close discrimination, application, and, because of the concealment of the actuating means of the blocks, to concentration and a measurable degree of abstraction.

The constructional details of my invention, manner of use, and further application thereof will be pointed out more fully in the course of the following description, reference being had to the accompanying drawings, in which I have shown one embodiment of my invention, and the latter will be more particularly defined in the appended claims.

In the drawings, Figure 1 is a perspective view of the complete apparatus. Fig. 2 is an enlarged sectional detail thereof, the adjacent supporting-leg being omitted. Fig. 3 is a perspective view of the magnetic actuator or moving medium. Fig. 4 is a perspective view of one of the blocks or information-stations, and Fig. 5 is a similar view of another form of block.

It will be understood that my invention is capable of a great variety of embodiments; but for the purpose of illustration I have herein shown a simple form thereof by means of which the invention may be readily understood.

As herein shown, I provide a table or copying-surface $a$, herein shown as composed of ground glass $a'$, carried in a frame $a^2$, the latter containing a runway or holding-recess $a^3$ on its under side beneath the glass in which a map or other subject $a^4$ to be copied may be removably held, being slid in through a slit $a^5$ at one end of the table.

The table $a$ is supported on legs $a^6$, hinged at $a^7$ and retained in position by means of struts $a^8$, hinged at $a^9$ to the table, so that the legs and struts may be turned in against the table for convenient packing and carrying purposes. This construction adapts the apparatus to convenient removal and storage. So, likewise, do the parts to be yet explained, although it will be understood that a wide variety of embodiments are contemplated within the scope of my invention. The magnet, however, or the mechanism coöperating therewith contains means for varying the attractive influence of the magnet on the blocks, to be referred to, either by shielding the magnet or by moving it toward and from said blocks. I am aware that it is not new to use a magnet for moving blocks, and I make no claim thereto, my invention requiring mechanism under the control of the operator for varying the attractive influence of the magnet and enabling the latter to be manipulated not in a haphazard manner, but according to the will and mental control of the child, being therefore truly an educational apparatus. Said mechanism preferably supports the magnet, although capable of various embodiments, and is herein shown as combined with the handle or magnet-shifting device, which I will now describe.

Adapted to operate beneath the table is a magnet $b$, slidingly mounted in guides $b'$ of a support $b^2$, having legs $b^3$, terminating in rollers or balls $b^5$, adapted to slide freely over the top of a stand or other support on which the table $a$ may be placed. The magnet $b$ is connected to the free end of a lever $b^6$, pivoted at $b^7$ in a handle $b^8$, said lever $b^6$ having at its outer end a thumb-piece $b^9$, by which it may be depressed, and is preferably provided also with suitable means, herein shown as notches or projections $b^{10}$ $b^{12}$, in position to be engaged by a spring-actuated dog $b^{13}$, pivoted at $b^{14}$ to the handle and having a thumb-piece $b^{15}$, by which it may be disengaged from the lever, said notches serving to retain the magnet in more or less raised proximity to the glass for exerting a greater or a less attractive influence on the movable blocks, as it is desired to move larger or smaller blocks, it being understood that smaller blocks will respond more readily and quickly than larger blocks. At its upper end the magnet $b$ carries a shielding device, which may be of any suitable construction and shape, being herein shown as simply a block $b^{16}$, adapted to be moved up or down on the ends of the magnet for shielding the same or limiting the distance that said magnet may move toward the glass $a'$.

In Figs. 4 and 5 I have shown in detail certain forms of blocks or information-stations which may be placed on the table, as indicated in Fig. 1, to be moved over the same by the magnetic influence of the actuator, said blocks being shown as consisting of disks or plates $c$, having on their upper surfaces holding devices or clips $c'$, in which, preferably, pictorial representations of the particular information or data may be mounted, as indicated in Fig. 1. Said blocks $c$ have soft-iron bottom surfaces $c^2$, adapted to be attracted by the magnet $b$.

The form of block shown in Fig. 5 is preferably employed for indicating historical, geographical, or biographical information, and the form of block shown in Fig. 4 is used for carrying pictorial or physical representations of the flora, fauna, races, &c., of a country or for similar representations of the flags, ships, industries, &c., of the country.

It will be understood that while I have termed my device an "educational apparatus" and use the same as a game or toy the uses thereof are by no means limited thereto, as its use would be of advantage in high institutions of learning and, indeed, for certain display purposes where it might be desired to convey information—as, for example, in following the maneuvers of a fleet.

In use the map or drawing which is to serve as the subject for the lesson or game or particular instruction in hand is slid through the slit $a^5$ into position beneath the ground glass $a'$, and the pupil or youth is then required to copy accurately the outlines thereof on the ground glass. Then the first set of blocks which are to be used is placed on the top of the table $a$ and scattered around in standing position promiscuously. The player then depresses the lever $b^6$ by pressing down upon the thumb-piece $b^9$, so as to bring the magnet into proximity to the glass to attract the various blocks. The lever is held depressed by the dog $b^{13}$, so that all that the operator is required to do is simply to move the magnet here or there, thereby simultaneously moving any particular block to its required position relatively to the country.

We will suppose that the user is locating the cities of a country and that the first block moved is New York. When New York is brought to the proper position on the map, the player depresses the thumb-piece $b^{15}$, thereby permitting the magnet to drop out of range of the New York block. The magnet is then slid beneath the Chicago block and raised by depressing the lever $b^6$, whereupon a further movement of the magnet serves to carry the Chicago block to its required place, where it is left simply by permitting the magnet to drop down relatively to its support $b^2$, moving its field of influence away from the soft-iron bottom $c^2$ of the block. This process is repeated for all the cities of the country. Let it be supposed that next the player is required to properly distribute certain other information-blocks—as, for example, the fauna of the country. He will move the block $b^{16}$ upwardly on the magnet, so as to prevent the latter from coming into as close proximity to the glass as previously and will also use smaller blocks—such, for example, as shown in Fig. 5—which being smaller respond more readily to the shifting influence of the actuator, and the latter, being partially shielded, may be moved beneath one of the larger and previously-placed blocks without disturbing the same. Having distributed the second series or set of blocks, a careful player may distribute other sets without disturbing the previously-placed blocks. Blocks representing ships may be made to reproduce voyages.

From the above description it will be seen that my invention is capable of an endless variety of applications, and accordingly I do not limit myself otherwise than as expressed hereinafter in the claims.

Having described my invention, what I claim as new, and desire to secure by Letters Patent, is—

1. An educational apparatus comprising a table having a top surface through which a map or similar object may be seen and on which it may be drawn or copied, means beneath said top surface for receiving and holding a map in position to be copied, supports for said table holding the same elevated sufficiently to permit free movement of an actuator, blocks or movable information-stations having their bases containing material to be attracted by a magnet, and an actuator containing a magnet adapted to be moved beneath said table for shifting the blocks as may be desired.

2. An educational apparatus comprising a copying-surface, means behind the said surface for retaining an object to be copied on said surface, a magnet movable behind said surface, means extending beyond said surface for moving said magnet, information-stations mounted on said surface and provided with means attractive to said magnet, whereby movement of the latter correspondingly moves the said stations to the locations required by the object copied thereon.

3. An educational apparatus comprising a table, having a surface capable of readily receiving marks, and sufficiently transparent to display therethrough an object placed behind the same, means behind said surface for holding a map to be copied, movable blocks carried on said surface and containing magnetically-attractive material, an actuator beneath said table provided with a handle extending beyond the table at one end, and having at its other end a magnet to attract said blocks, a support for said magnet provided with means permitting the same to slide around beneath the table, and means for raising or lowering the magnet relatively to said surface.

4. An educational apparatus comprising a table, having a surface capable of readily receiving marks, and sufficiently transparent to display therethrough an object placed behind the same, means behind said surface for holding a map to be copied, movable blocks carried on said surface and containing magnetically-attractive material, an actuator beneath said table provided with a handle extending beyond the table at one end, and having at its other end a magnet to attract said blocks, a support for said magnet provided with means permitting the same to slide around beneath the table, and means for varying the attractive influence of said magnet on said blocks.

5. An educational apparatus comprising a table, having a surface capable of readily receiving marks, and sufficiently transparent to display therethrough an object placed behind the same, means behind said surface for holding a map to be copied, movable blocks carried on said surface and containing magnetically-attractive material, an actuator beneath said table provided with a handle extending beyond the table at one end, and having at its other end a magnet to attract said blocks, a support for said magnet provided with means permitting the same to slide around beneath the table, a lever pivoted to said handle, said magnet being carried by the inner end of said lever, to be raised and lowered by the depressing or raising of the outer end of said lever.

6. An educational apparatus comprising a table, having a surface capable of readily receiving marks, and sufficiently transparent to display therethrough an object placed behind the same, means behind said surface for holding a map to be copied, movable blocks carried on said surface and containing magnetically-attractive material, an actuator beneath said table provided with a handle extending beyond the table at one end, and having at its other end a magnet to attract said blocks, a support for said magnet provided with means permitting the same to slide around beneath the table, a lever pivoted to said handle, said magnet being carried by the inner end of said lever, to be raised and lowered by the depressing or raising of the outer end of said lever, and means for detachably holding the other end of the lever in depressed position.

7. An educational apparatus comprising a thin table, having folding legs secured thereto, movable blocks bolted on said table and provided with magnetically-attractive material in their bases, and an actuator for moving said blocks, said actuator comprising a handle, a lever, a magnet, and a support for the latter, said support being carried by the inner end of said handle, and said lever being pivotally mounted in said handle and carrying the magnet at its inner end in said support, the outer end of the lever being in position to be engaged and operated by the manipulator of the handle, and serving to raise or lower the magnet beneath the table into or out of attractive relation with the blocks on said table for positioning the latter as required.

8. An educational apparatus comprising a thin table, movable blocks on said table and provided with magnetically-attractive material in their bases, and an actuator for moving said blocks, said actuator comprising a handle, a lever, a magnet, and a support for the latter, said support being carried by the inner end of said handle, and said lever being pivotally mounted in said handle and carrying the magnet at its inner end in said support, the outer end of the lever being in position to be engaged and operated by the manipulator of the handle, and serving to raise or lower the magnet into or out of attractive relation with the blocks on said table for positioning the latter as required.

9. An educational apparatus comprising a thin table, movable blocks on said table and provided with magnetically-attractive material in their bases, and an actuator for moving said blocks, said actuator comprising a handle, a lever, a magnet, and a support for the latter, said support being carried by the inner end of said handle, and said lever being pivotally mounted in said handle and carrying the magnet at its inner end in said support, the outer end of the lever being in position to be engaged and operated by the manipulator of the handle, and serving to raise or lower the magnet into or out of attractive relation with the blocks on said table for positioning the latter as required, the support for said actuator being provided with legs terminating in ball-like ends, for permitting the same to slide readily as required.

In testimony whereof I have signed my name to this specification in the presence of two subscribing witnesses.

WILLIAM LORD SMITH.

Witnesses:
GEO. H. MAXWELL,
ADOLPH P. KAISE.